United States Patent
Maeda et al.

(10) Patent No.: US 8,266,475 B2
(45) Date of Patent: Sep. 11, 2012

(54) STORAGE MANAGEMENT DEVICE, STORAGE MANAGEMENT METHOD, AND STORAGE SYSTEM

(75) Inventors: Chikashi Maeda, Kawasaki (JP); Mikio Ito, Kawasaki (JP); Hidejirou Daikokuya, Kawasaki (JP); Kazuhiko Ikeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 370 days.

(21) Appl. No.: 12/718,405

(22) Filed: Mar. 5, 2010

(65) Prior Publication Data

US 2010/0229033 A1 Sep. 9, 2010

(30) Foreign Application Priority Data

Mar. 9, 2009 (JP) .................................. 2009-55713

(51) Int. Cl.
G06F 11/07 (2006.01)
(52) U.S. Cl. ...................... 714/6.32; 714/6.22; 714/6.23; 714/6.24; 714/15
(58) Field of Classification Search .................. 714/6.22, 714/6.24, 6.32
See application file for complete search history.

(56) References Cited

U.S. PATENT DOCUMENTS

| | | | |
|---|---|---|---|
| 2004/0057316 A1* | 3/2004 | Kozakai et al. | 365/222 |
| 2004/0133743 A1 | 7/2004 | Ito et al. | |
| 2004/0243777 A1* | 12/2004 | Suzuki et al. | 711/162 |
| 2008/0005612 A1* | 1/2008 | Arai | 714/6 |
| 2008/0091982 A1* | 4/2008 | Bartlett et al. | 714/45 |
| 2008/0141043 A1* | 6/2008 | Flynn et al. | 713/193 |
| 2008/0168304 A1* | 7/2008 | Flynn et al. | 714/7 |
| 2008/0208930 A1* | 8/2008 | Kubo et al. | 707/204 |
| 2008/0263393 A1* | 10/2008 | Shirogane et al. | 714/7 |
| 2009/0037656 A1* | 2/2009 | Suetsugu et al. | 711/114 |
| 2009/0216969 A1 | 8/2009 | Winokur | |
| 2009/0240992 A1* | 9/2009 | Ishii et al. | 714/48 |
| 2009/0292945 A1* | 11/2009 | Kano et al. | 714/5 |

FOREIGN PATENT DOCUMENTS

| | | |
|---|---|---|
| JP | 2003-108316 | 4/2003 |
| JP | 2004-213064 | 7/2004 |
| JP | 2006-113841 | 4/2006 |
| JP | 2007-323251 | 12/2007 |
| JP | 2007-323252 | 12/2007 |
| JP | 2008-15918 | 1/2008 |
| JP | 2008-538624 | 10/2008 |
| JP | 2009-37304 | 2/2009 |

OTHER PUBLICATIONS

Japanese Office Action issued Nov. 30, 2010 in corresponding Japanese Patent Application 2009-055713.

* cited by examiner

*Primary Examiner* — Chae Ko
(74) *Attorney, Agent, or Firm* — Staas & Halsey LLP (57) ABSTRACT

A storage system includes data storage devices, spare storage devices used when a failure occurs in a data storage devices, a group management unit that divides the data storage devices into groups and implements a redundancy, a data storage device restoration unit that assigns the spare storage device as a replacement when a failure occurs, and a configuration change unit changing configuration of the group to which the data storage devices belong. The configuration change unit includes, a spare storage device securing unit that secures the spare storage device, a change processor that writes data concerning the group into the spare storage device, and a change restoration unit that performs continuation of the configuration change, or restoration of the group to a state in a start, using the data written into the spare storage device when the configuration change of the group is interrupted.

11 Claims, 9 Drawing Sheets

RAID MANAGEMENT TABLE

| RAID GROUP NUMBER | RAID LEVEL | RAID GROUP STATUS | NUMBER OF MEMBER DISKS | MEMBER DISKS | CONFIGURATION CHANGE MODE | PRIORITY OF CONFIGURATION CHANGE |
|---|---|---|---|---|---|---|
| G1 | RAID5(3+1) | Available | 4 | D11,D21,D31,D41 | REVERSIBLE CONVERSION GUARANTEE | CONFIGURATION CHANGE PRIORITY |
| G2 | | Exposed | 5 | | SALVAGE GUARANTEE | OWN GROUP DISK FAILURE ADDRESSING PRIORITY |
| G3 | | Available | 3 | | SPARE NON-USAGE | DISK FAILURE ADDRESSING PRIORITY |
| ... | ... | ... | ... | ... | ... | ... |

FIG. 4

DISK MANAGEMENT TABLE

| DISK NUMBER | DISK STATUS | ADDED INFORMATION BIT | OWN RAID GROUP |
|---|---|---|---|
| D11 | Available |  | G1 |
| D12 | Spare |  |  |
| ⋮ | ⋮ | ⋮ | ⋮ |

FIG. 5

BUFFER MANAGEMENT TABLE

| BUFFER ADDRESS | REAL ADDRESS | BUFFER GROUP |
|---|---|---|
| 0 | ⋮ | SECOND BUFFER |
|  | ⋮ | ⋮ |
| Ba001 ← IN USE FINAL ADDRESS | ⋮ | SECOND BUFFER |
|  | ⋮ | ⋮ |
|  | ⋮ | ⋮ |
| Ba002 ← IN USE HEAD ADDRESS | ⋮ | FIRST BUFFER |
|  | ⋮ | ⋮ |
| Ba003 | ⋮ | FIRST BUFFER |
| Ba004 | ⋮ | SECOND BUFFER |
|  | ⋮ | ⋮ |
| FINAL ADDRESS | ⋮ | SECOND BUFFER |

FIG. 10

STORAGE MANAGEMENT DEVICE, STORAGE MANAGEMENT METHOD, AND STORAGE SYSTEM

CROSS-REFERENCE TO RELATED APPLICATIONS

This application is based upon and claims the benefit of priority of the prior Japanese Patent Application No. 2009-55713, filed on Mar. 9, 2009, the entire contents of which are incorporated herein by reference.

FIELD

The present invention relates to a storage management device, a storage management method, and a storage system that divide storage devices into groups and that implement the distribution and the redundancy of user data between data storage devices in the group.

BACKGROUND

Hitherto, techniques have been utilized for enhancing the reliability and the access speed of a storage system by dividing a plurality of storage devices into groups and implementing the distribution and the redundancy of data between data storage devices in the group.

As such a storage system, for example, RAID (redundant arrays of inexpensive disks) in which hard disks are used for the storage device, is well known in the art. The RAID is a technique for combining a plurality of hard disks and operating them as one virtual hard disk. There is known RAIDs at seven kinds of levels: RAID 0 to RAID 6. Among the RAID 0 to RAID 6, especially, the RAID 0, RAID 1, RAID 5, and RAID 6 are frequently utilized.

The RAID 0 distributes data among a plurality of hard disks and performs reading/writing for speeding-up. The RAID 1 makes data redundant by performing mirroring in which the same content is concurrently written into a plurality of hard disks, to thereby enhance fault tolerance. The RAID 5 distributively records data as well as an error correcting code into a plurality of hard disks, to thereby improve both the fault tolerance and access performance. The RAID 6 is RAID having improved reliability over the RAID 5, and it creates two kinds of redundancy data and records them into two disks, whereby it can address a dual fault, and can restore data even if two drives simultaneously fail.

In each of the RAID 1, RAID 5, and RAID 6, even if some hard disks fail, a logical disk can operate. When a hard disk failure has occurred, the failed hard disk is removed while still operating the virtual disk that has been created using a plurality of hard disks including the failed one, and the failed hard disk is replaced with a replacement hard disk, whereby operation can be continued without deactivating the device. Here, a preparatory disk that is connected instead of the hard disk having failed during an operation of the storage system and that is provided so as to be readily available, is referred to as a "spare disk".

The storage system includes a plurality of groups, and when each of the groups is treated as a virtually disk, spare disks can be shared between groups.

Besides, there is known so-called LDE (logical device expansion) that performs configuration changes such as a configuration change that, while operating a RAID group, adds new disks to increase the disk capacity of the entire group with the identical RAID level unchanged; and a configuration change that changes the RAID level.

When performing a configuration change of the storage group, data is read out from the logical disk on the basis of an old configuration, and the read-out data is temporarily stored into a buffer. Thereafter, the data is written into logical disk on the basis of a new configuration. During the period from the point in time when the data has been read out until the writing is completed, there occurs a situation in which the data temporarily exists only in the buffer.

Specifically, during the writing from the buffer into the logical disk of the new configuration, it is unclear to what extent the data has been written into the real disk, so that the data in the disk as writing-in processing target is in an unreliable state.

Accordingly, there is a possibility that the data in the buffer may disappear when there occurs a failure of a memory being used as a buffer, or a state where a battery backup becomes nonfunctional due to power outage.

Furthermore, in the conventional art, once a configuration change of the storage group has been started, it has not been possible to interrupt the configuration change in the course of processing to restore the original configuration. For this reason, it has been impossible to address the situation in which the undoing of configuration change is required because of an operation miss, a change in a system operating condition, or the like.

The techniques disclosed herein have been implemented in view of the above-described problem. Embodiments of the techniques disclosed herein present a storage management device, a storage management method, and a storage system capable of preventing disappearance of data in the course of configuration change, and of interrupting the configuration change to restore the original configuration.

SUMMARY

According to an aspect of the invention, a storage system includes data storage devices, a spare storage devices used when a failure occurs in a data storage devices, a group management unit that divides the data storage devices into groups and implements a redundancy, a data storage device restoration unit that assigns the spare storage device as a replacement when a failure occurs, and a configuration change unit changing configuration of the group to which the data storage devices belong. The configuration change unit includes, a spare storage device securing unit that secures the spare storage device, a change processor that writes data concerning the group into the spare storage device, and a change restoration unit that performs continuation of the configuration change, or restoration of the group to a state in a start, using the data written into the spare storage device when the configuration change of the group is interrupted.

It is to be understood that both the foregoing general description and the following detailed description are exemplary and explanatory and are not restrictive of the invention, as claimed.

The above-described embodiments of the present invention are intended as examples, and all embodiments of the present invention are not limited to including the features described above.

BRIEF DESCRIPTION OF THE DRAWINGS

FIG. 3 is a diagram illustrating a specific example of RAID management table 12a;

DESCRIPTION OF EMBODIMENTS

Reference may now be made in detail to embodiments of the present invention, examples of which are illustrated in the accompanying drawings, wherein like reference numerals refer to like elements throughout.

Hereinafter, a storage management device, a storage management method, and a storage system according to an embodiment disclosed by the present application will be described in detail with reference to the appended drawings. It is to be understood that the present invention is not limited to this embodiment.

Figure 1:
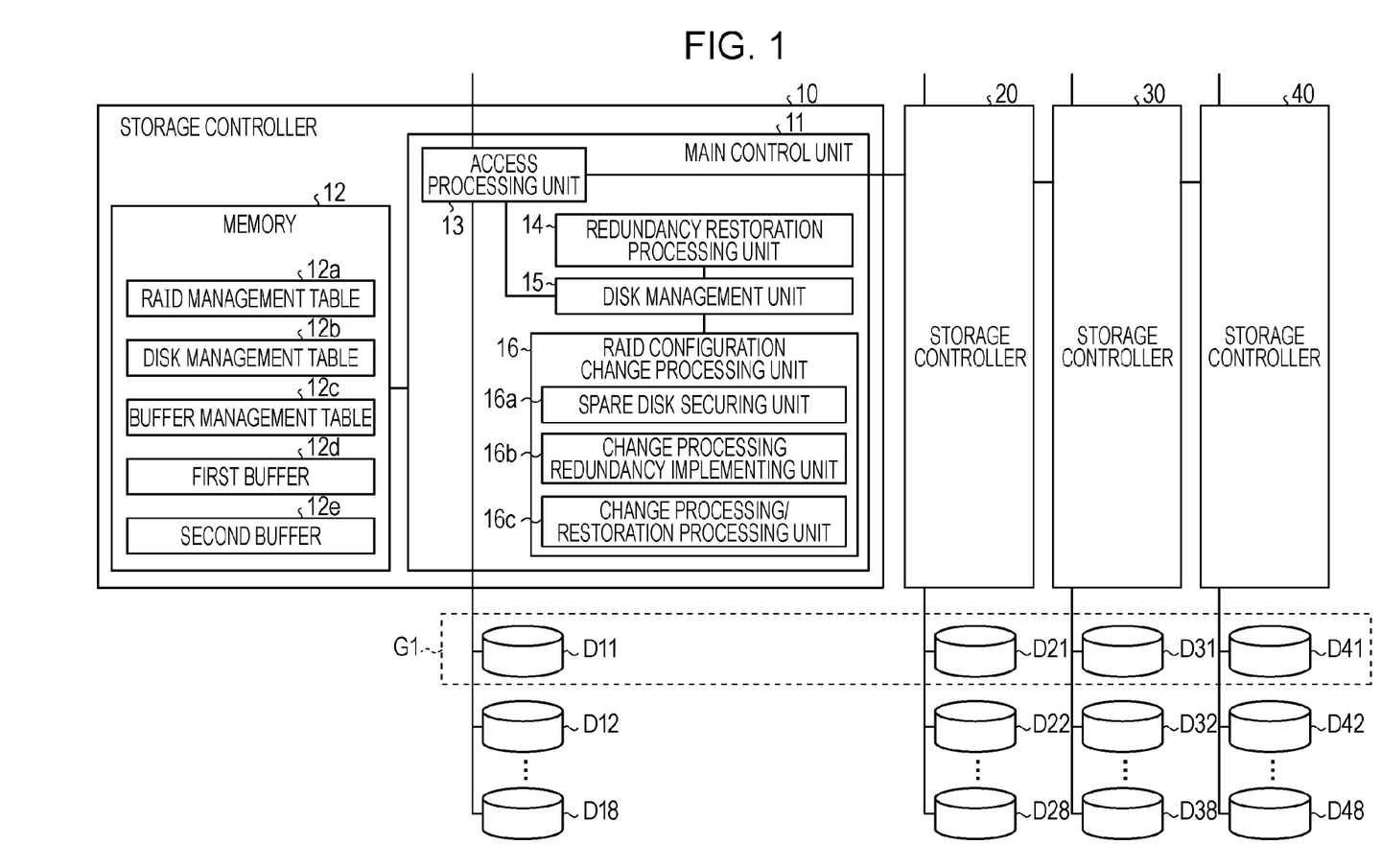
FIG. 1 is a schematic block diagram of a storage system according to an embodiment of the techniques disclosed herein.

FIG. 1 illustrates a schematic configuration of the storage system according to this embodiment. The storage system illustrated in FIG. 1 includes storage controllers 10, 20, 30, and 40 serving as storage management devices. The storage controller 10 is connected to disks D11 to D18 functioning as storage devices (so-called storages) that store user data. Likewise, the storage controller 20 is connected to disks D21 to D28, the storage controllers 30 is connected to disks D31 to D38, and the storage controller 40 is connected to disks D41 to D48.

The storage controller 10 has therein a main control unit 11 and a memory 12. Furthermore, the main control unit 11 has therein an access processor 13, a redundancy restoration processor 14, a disk management unit 15, and a RAID configuration change processor 16. Each of the processors included in the main control unit 11 may be implemented by wired logic, PLD (programmable logic device) or the like. Furthermore, the main control unit 11 may be implemented by an arithmetic unit such as a CPU (central processing unit), and each processing may be implemented by software.

The access processor 13 processes an access request with respect to the storage from a host (not illustrated). The storage controller 10 is connected to its subordinate disks 11 to 18 and the other storage controllers. The access processor 13 can access not only to disks connected to the storage controller 10, but also to the disks connected to the other storage controllers.

Here, the disks D11 to D18, the disks D21 to D28, the disks D31 to D38, and the disks D41 to D48 are grouped as four RAID groups. In FIG. 1, as an example, four disks: disks D11, D21, D31, and D41 constitutes one RAID group, G1.

The host, therefore, accesses to the disks belonging to the group 1 upon recognizing them as one virtual storage.

The disk management unit 15 manages the disks and the RAID groups. Regarding each of the RAID groups, the disk management unit 15 manages the state of the group and the disks belonging to the group. The disk management unit 15 further manages a disk state of each of the disks, that is, it manages whether each of the disks belongs to a RAID group or is set as a spare disk. Details will be described later.

The access processor 13 references states of the RAID groups managed by the disk management unit 15, and processes an access from the host to a logical storage upon converting the access into an access therefrom to a disk serving as a physical storage.

When a disk operating within a redundant RAID group fails to thereby decrease in redundancy or lose it, the redundancy restoration processor 14 replaces the failed disk with one or more disks set as spare disks to restore the redundancy of the RAID group.

The RAID configuration change processor 16 is a processing unit for implementing the so-called LDE that performs the increase/decrease of the number of disks within the RAID group and a change of the RAID level. For example, the RAID configuration change processor 16 performs configuration changes such as a configuration change that, while operating the RAID group, i.e., while accepting an access from the host, adds new disks to increase the storage capacity of the entire group with the RAID level unchanged; and a configuration change that changes the RAID level.

When performing a configuration change of the RAID group, the RAID configuration change processor 16 stores data read-out from a disk of the old configuration into one or more unused spare disks to thereby make data concerning the configuration change processing of the RAID group redundant.

For the purpose of implementing redundancy of the data concerning this configuration change processing, the RAID configuration change processor 16 includes a spare disk securing unit 16a, a change processing redundancy implementing unit 16b, and a change processing/restoration processor 16c.

When starting the configuration change of the RAID group, the spare disk securing unit 16a secures one or more disks that are set as spare disks and that are unused, for making the configuration change processing redundant.

The change processing redundancy implementing unit 16b writes data read-out from the old configuration and written into the buffer, that is, data concerning the configuration change processing of the RAID group, into the one or more spare disks secured by the spare disk securing unit 16a, thereby making the configuration change processing redundant.

When the configuration change of the RAID group is interrupted, the change processing/restoration processor 16c performs continuation of the configuration change of the RAID group using the data written into the one or more spare disks, or restoration of the RAID group to its states before the start of the change.

The memory 12 is a storage unit for holding various data used inside the storage controller 10, and it stores therein a RAID management table 12a, a disk management table 12b, a buffer management table 12c, a first buffer 12d, and a second buffer 12e. Here, illustrated as example is a configuration in which the RAID management table 12a, the disk management table 12b, the buffer management table 12c, the first buffer 12d, and the second buffer 12e are all held in the memory 12. However, information included in each of the above-described units may also be held in a storage unit provided exclusively for each of them. Further alternatively, a method may be used wherein pieces of information for the above-described units are appropriately combined into some information groups and distributively held among a plurality of storage units.

The RAID management table 12a is a table used by the disk management unit 15 for managing the RAID groups, while the disk management table 12b is a table used by this disk management unit 15 for managing the disks.

The buffer management table 12c is a table for managing buffers used by the RAID configuration change processor 16 during configuration change. Here, the first buffer 12d and the second buffer 12e are buffer regions into which data is written during the configuration change.

Because the storage controllers 20, 30, and 40 each have the same configuration as the storage controller 10, the configurations of the storage controllers 20, 30, and 40 are omitted from description.

Figure 2:
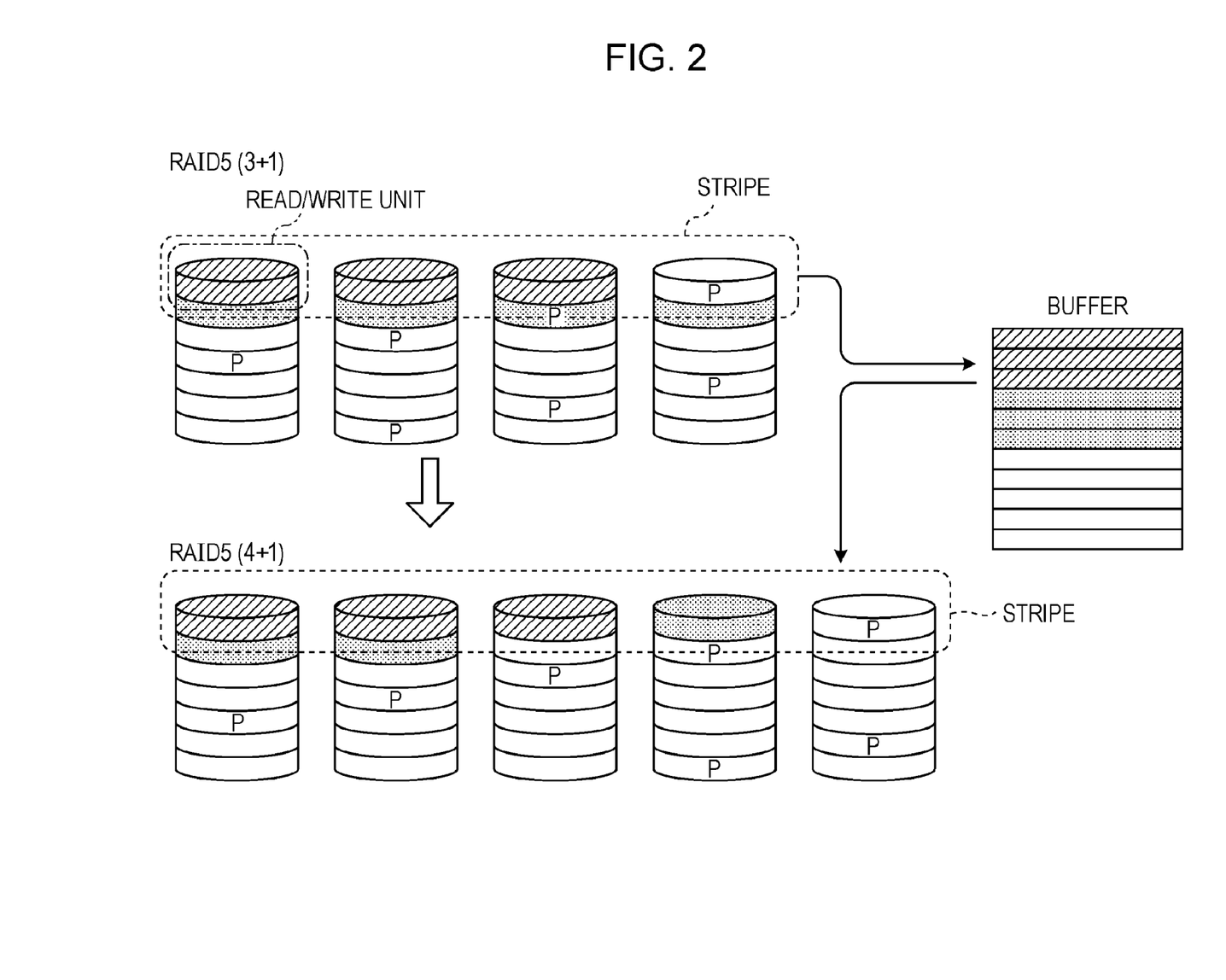
FIG. 2 is an explanatory diagram illustrating the usage of a buffer in a configuration change processing of RAID groups.

Next, with reference to FIG. 2, usage of buffers in the configuration change processing of the RAID group will be described. An example illustrated in FIG. 2 represents a change from RAID 5(3+1) to RAID 5(4+1).

Regarding RAID 5(3+1), a capacity for three disks out of four disks is used for storing data, and a capacity for one disk is used for storing redundancy. Likewise, regarding the RAID 5(4+1), a capacity for four disks out of five disks is used for storing data, and a capacity for one disk is used for storing redundancy data. In the RAID 5, either of the user data and the redundancy data is distributively stored among the disks.

More specifically, one obtained by acquiring one unit out of access units with respect to a disk, from each disk, is 1 stripe, which constitutes a read/write unit for the RAID group. Each stripe includes one piece of redundancy data, and which disk holds the redundancy data depends upon the stripe. Because the parity P based on exclusive OR is generally used for redundancy data in the RAID 5, the redundancy data in the RAID 5 is hereinafter described as parity P. Also, in the description of the read/write of data with respect to the disk, the above-described read/write unit is treated as one piece of data.

When the configuration is changed from RAID 5(3+1) to RAID 5(4+1), user data is read out from RAID 5(3+1) and once stored in a buffer. This reading-out from the old configuration is performed by a stripe unit of the old configuration. The reading-out is implemented with respect to the user data except for parity P, i.e. redundancy data. Therefore, if the old configuration is RAID 5(3+1), the number of pieces of data read-out from the disk equals to a multiple of 3 (i.e., the number of pieces of data equals to a multiple of three read/write units).

The user data stored in the buffer is thereafter written back into the new configuration RAID 5(4+1), to which one disk has been added, and the parity P in the new configuration is calculated. This writing-back into the new configuration is performed by the stripe unit of the new configuration. Therefore, if the new configuration is RAID 5(4+1), the number of pieces of data to be written into the disk is a multiple of five access units, which are obtained by adding one access unit of the parity P to four access units of the user data.

In this way, the reading-out from the old configuration is performed by the stripe unit of the old configuration, while the writing-in to the new configuration is performed by the stripe unit of the new configuration. Accordingly, it is preferable that the number of pieces of data to be read out from the old configuration and stored into the buffer, and the number of pieces of data to be written back from the buffer into the new configuration be made to be a common multiple between the number of pieces of data within 1 stripe of the old configuration and the number of pieces of data within 1 stripe of the new configuration.

For example, when the configuration is changed from RAID 5(3+1) to RAID 5(4+1), with the use of 12, which constitutes a common multiple between 3, i.e., the number of pieces of data within 1 stripe of the old configuration, and 4, i.e., the number of pieces of data within 1 stripe of the new configuration, 4 stripes of data is read out from the old configuration, and 3 stripes of data is written into the new configuration, whereby it is possible to make up the number of pieces of read/write data.

There is an upper limit to the number of pieces of data in one access to the RAID group, and therefore, out of common multiples between the number of pieces of data within 1 stripe of the old configuration and the number of pieces of data within 1 stripe of the new configuration, a maximum value lower than the upper limit to the number of pieces of data in one access is preferably used.

Figure 3:
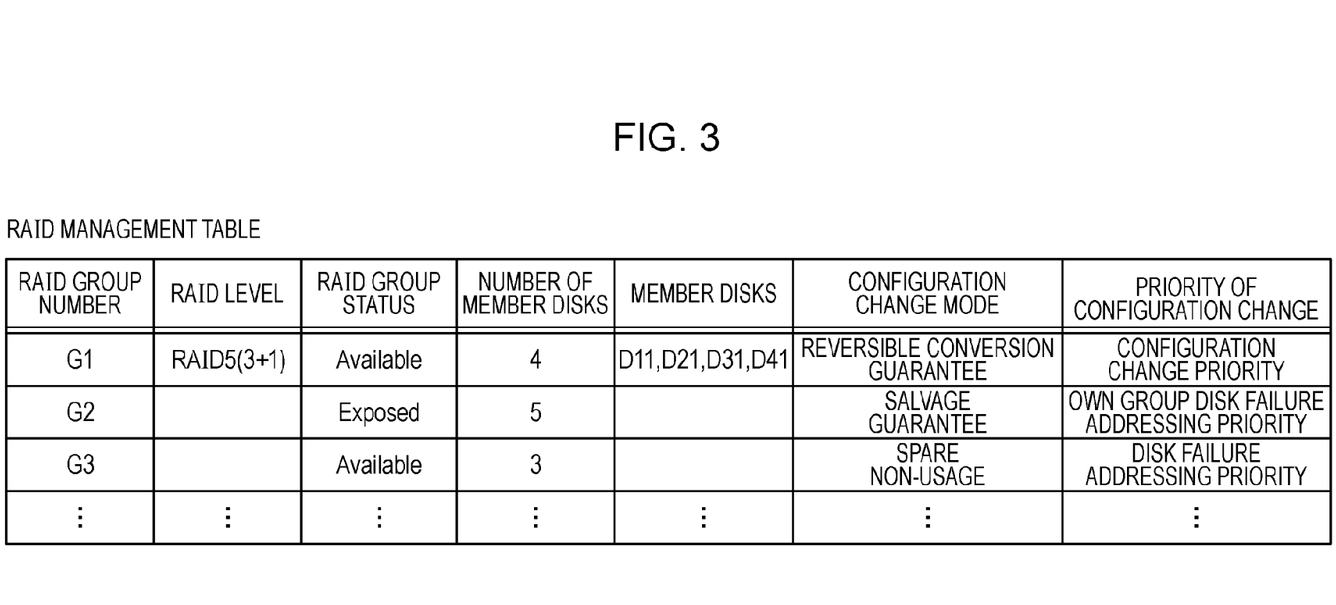

Next, a specific example of various data stored in the memory 12 will be described. FIG. 3 is a diagram illustrating a specific example of RAID management table 12a. The RAID management table 12a illustrated in FIG. 3 includes items: a "RAID group number", a "RAID level", a "RAID group status", a "number of main disks", a "member disks", a "configuration change mode", and a "priority of configuration change".

The "RAID group number" is a number for identifying a RAID group in the storage system, the "RAID level" represents a RAID level of the RAID group, and the "RAID group status" represents a status of the RAID group. The RAID group status values include "Available" indicating a normal state, "Exposed" indicating a state where redundancy has been lost by a disk failure, "Broken" indicating a state where a RAID group is unusable, and "Rebuild" indicating a state where data is in the course of restoration.

The "number of member disks" is a value representing the number of disks belonging to a RAID group, and the "member disks" is disk numbers of disks belonging to the RAID group.

The "configuration change mode" is an item for setting the treatment of spare disks at the time when the RAID configuration change processor 16 performs a configuration change, and takes either one of the values of a reversible conversion guarantee, a salvage guarantee, and a spare non-usage. This value can be selected when a RAID group is created, and can be changed as needed except when the configuration change is in execution.

The reversible conversion guarantee performs a function of holding all data concerning a configuration change in one or more spare disks. That is, data that has been written back into the new configuration is also held until a configuration change in execution is completed, thereby allowing the sending back of the data to the old configuration. The configuration change based on the reversible conversion guarantee requires the number of spare disks providing a capacity enough to hold all data within the RAID group.

The salvage guarantee performs a function of holding data within an in-process region in one spare disk, to thereby address data loss in volatile buffers due to a memory breakdown or a backup failure. In a configuration change based on the salvage guarantee, data read-out from the old configuration is held in a spare disk until it is written back into the new configuration.

The spare non-usage refers to implementing the same processing as that of the conventional configuration change that uses no spare disk and that does not make data concerning a configuration change redundant.

That is, the configuration change mode indicates the degree of redundancy implementation in a configuration change, and defines the degrees of reliability of configuration change as three kinds of levels.

The "priority of configuration change" is an item indicating whether the priority is placed on the maintaining of the level of the reliability degree of configuration change, or on disk failure addressing, i.e., on the restoration of redundancy of the RAID group, when a disk failure occurs in a state where one or more spare disks are in use for making a configuration change redundant.

Specifically, the item of the priority of the configuration change takes either one of the values of its own group disk failure addressing priority or the disk failure addressing priority. This value can be selected when a RAID group is created, and can be changed as needed except when a configuration change is in execution.

The RAID group that has set the configuration change priority as the item of the priority of configuration change processing holds one or more spare disks until the configuration change is completed, and even when a disk failure occurs, it uses no spare disk for Rebuild operation.

The RAID group that has set the own group disk failure addressing priority as the item of the priority of configuration change processing, when a disk failure occurs in its own group during a configuration change, releases one or more spare disks being used for making the configuration change redundant, and prioritizes the own group disk failure addressing to restore the redundancy of the RAID group. However, when a disk failure occurs in another group, the RAID group releases no spare disk.

The RAID group that has set the disk failure addressing priority as the item of the priority of configuration change processing, when a disk failure occurs during a configuration change, even if the failed disk belongs to another group, releases one or more spare disks being used for making the configuration change redundant to restore the redundancy of the other RAID group.

Figure 4:
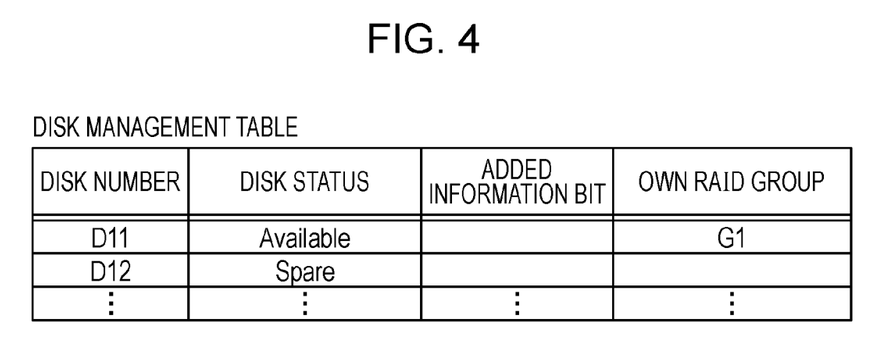
FIG. 4 is a diagram illustrating a specific example of disk management table 12b.

FIG. 4 is a diagram illustrating a specific example of disk management table 12b. The disk management table 12b illustrated in FIG. 4 includes items: "disk number", "disk status", "added information bit", and "own RAID group". Here, added information is managed by bit, but it can also be managed by an optional method such as flag.

The "disk number" is a number for identifying a disk within the storage system. The "disk status" represents a status of a disk. The disk status values include "Available" indicating a normal state, "Broken" indicating a failed state, "Present" indicating a state of belonging to no RAID group, "Rebuild" indicating a state where data is in the course of restoration, and "Spare" indicating that a disk is set as a spare disk.

The "added information bit" represents a state of a disk in more detail by adding it to the disk status, and is constituted of five bits: Enable IO bit, SMART bit, LDE bit, QF bit, and LDE_HS bit.

The Enable IO bit is a bit indicating whether an access from the access processor 13 is acceptable. The SMART bit is a bit indicating whether abnormality of a disk alone has been occurred. The LDE bit is a bit indicating whether a configuration change is in execution. For example, if a configuration change is in execution, LDE bit takes a value 1, and if not, it takes a value 0. The QF bit is a bit indicating whether a format is in execution. The LDE_HS bit is a bit indicating whether being used for making a configuration change redundant.

Therefore, by ascertaining LDE_HS bit regarding a disk of which the disk status value is Spare, it is possible to determine whether the spare disk has not yet been used for making the configuration change redundant and is in a state where it can be used, just as it is, for making the configuration change redundant in a RAID group, or the spare disk is being used for making the configuration change redundant and solution of conflict with the configuration change is required in order to use the spare disk for making the configuration change of the RAID group redundant.

The "own RAID group" means the number of a RAID group to which a pertinent disk belongs. In the case where the disk belongs to no RAID group, such as in the case where the disk is a spare disk, the value in this item is made blank.

Figure 5:
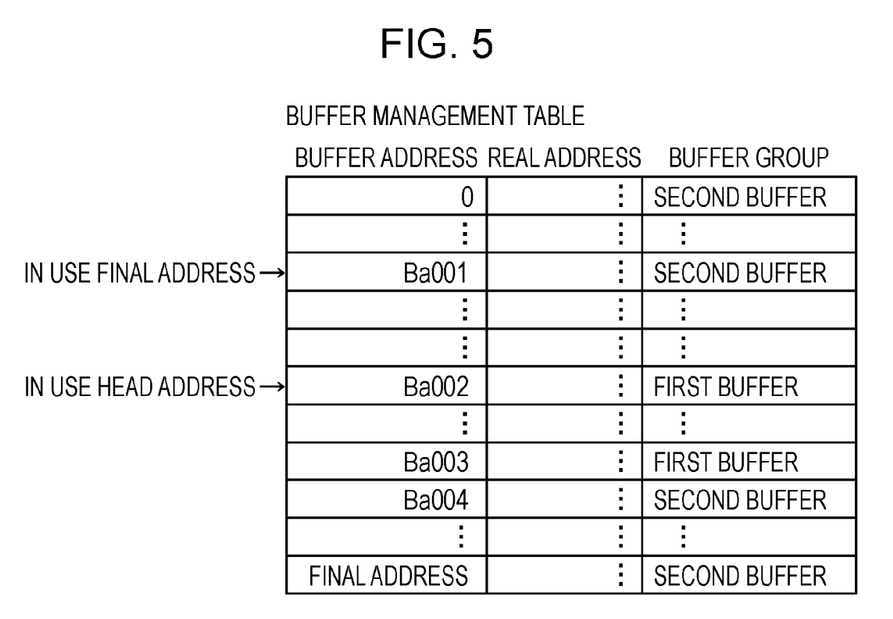
FIG. 5 is a diagram illustrating a specific example of buffer management table 12c.

FIG. 5 is a diagram illustrating a specific example of buffer management table 12c. The buffer management table 12c associates a buffer address with a real address and a buffer group, and further has values of in-use head address and in-use final address with respect to the entire buffer.

The buffer address is a buffer's virtual address held until data read-out from the old configuration is written into the new configuration during a configuration change, and the real address defines a real position of the virtual address in the memory. Here, the virtual address is a ring buffer, in which the in-use head address indicates a head position in use, and the in-use final address indicates a final position in use.

During a configuration change, the buffer is used upon being divided into a first buffer and a second buffer, and therefore, the value of the buffer group indicate whether the virtual buffer address and the real address are being used as the first buffer, or as the second buffer. Here, because the range from the in-use final address to the in-use head address is an unused address range, the value of the buffer group is made blank.

Figure 6:
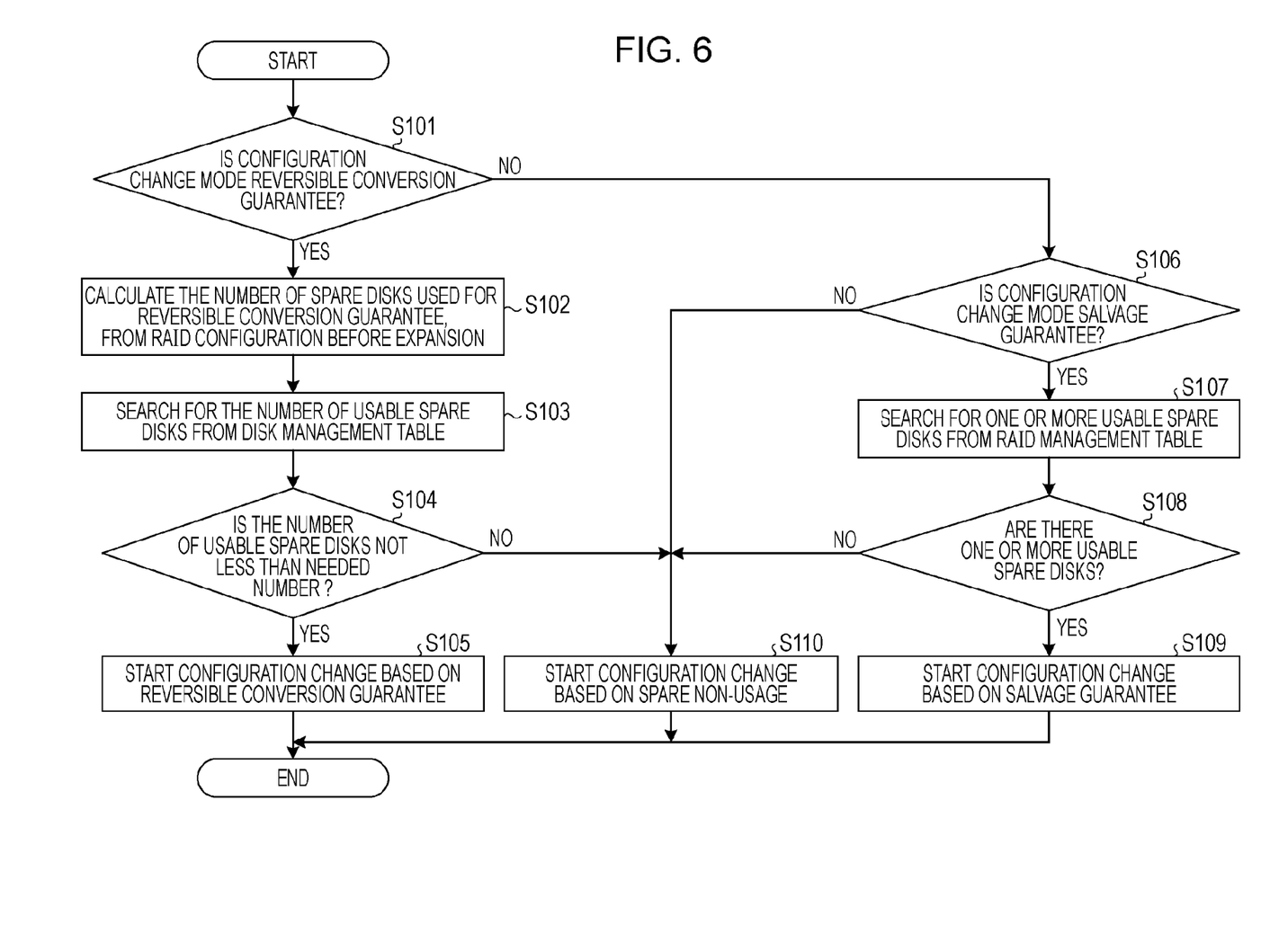
FIG. 6 is a flowchart explaining configuration change start processing.

Next, the start of a configuration change will be described. FIG. 6 is a flowchart explaining configuration change start processing. When performing the configuration change of a RAID group, the RAID configuration change processor 16 references the RAID management table 12a, and determines whether the configuration change mode of a target RAID group is the reversible conversion guarantee (S101).

If the configuration change mode is the reversible conversion guarantee (Yes in S101), the spare disk securing unit 16a calculates the number of spare disks used for the reversible conversion guarantee, from the RAID configuration before configuration change (S102). Here, the required number of the spare disks may be previously stored in the table at the timing when the configuration change mode is set. Furthermore, the spare disk securing unit 16a references the disk management table 12b, and searches for the number of usable spare disks (S103). Specifically, the spare disk securing unit 16a counts the number of disks of which disk statuses are each Spare, and of which the added information bits each indicate that no configuration change is being executed. If the number of usable spare disks is not less than the needed number (Yes in S104), the RAID configuration change processor 16 starts a configuration change based on the reversible conversion guarantee (S105).

On the other hand, if the configuration change mode is not the reversible conversion guarantee (No in S101), the RAID configuration change processor 16 references the RAID management table 12a, and determines whether the configuration change mode of the target RAID group is the salvage guarantee (S106).

If the configuration change mode is the salvage guarantee (Yes in S106), the spare disk securing unit 16a references the disk management table 12b, and searches for one or more usable spare disks (S107). If there are one or more usable spare disks (Yes in S108), the RAID configuration change processor 16 starts a configuration change based on the salvage guarantee (S109).

When the configuration change mode is the spare non-usage (No in S106); when the configuration change mode is the reversible conversion guarantee and the number of usable spare disks is less than a needed number (No in S104); and when the configuration change mode is the salvage guarantee and there is no usable spare disk (No in S108), the RAID configuration change processor 16 starts a configuration change based on the spare non-usage (S110).

Figure 7:
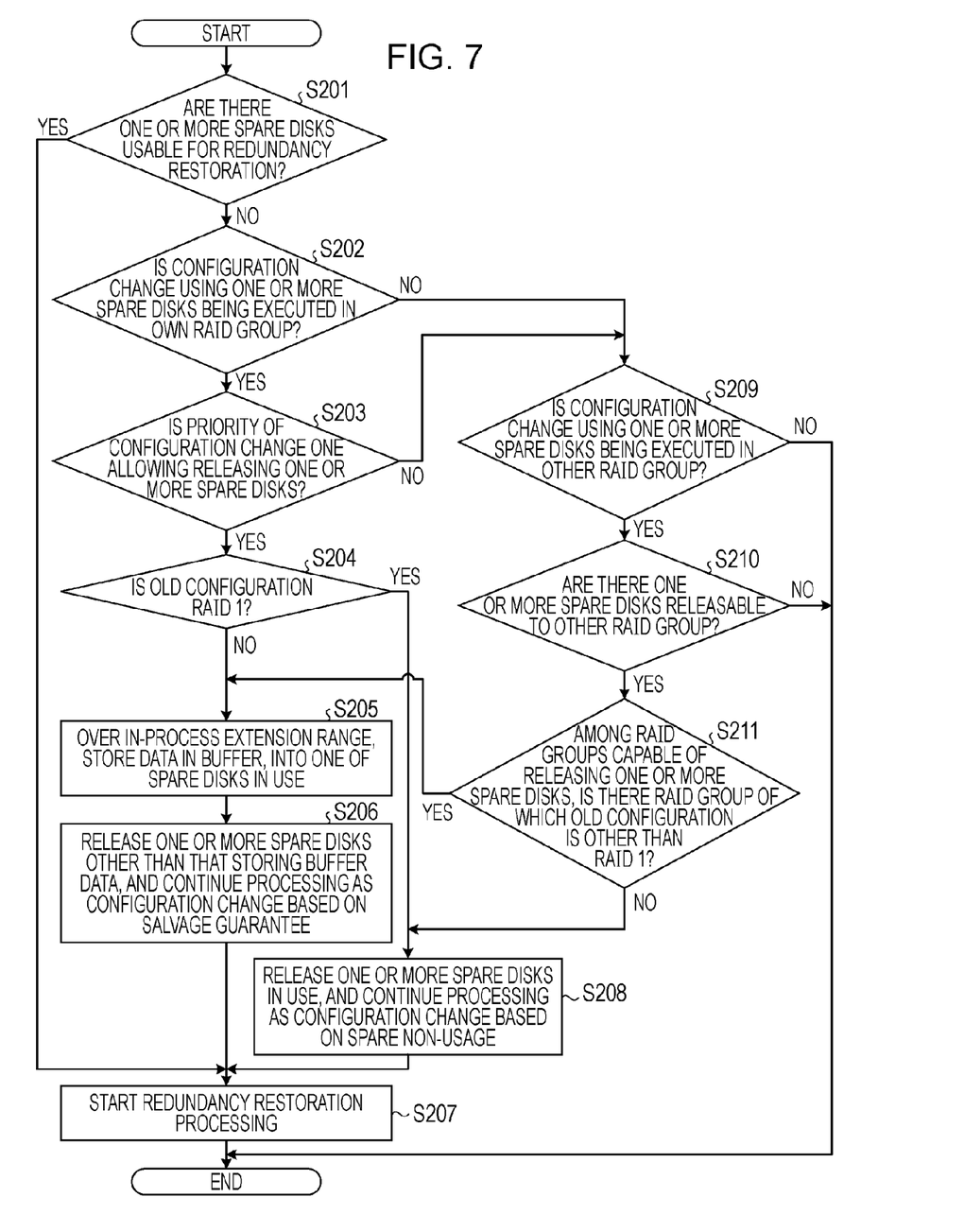
FIG. 7 is a flowchart explaining processing operation of a storage controller at the time when a disk failure has occurred during the execution of a configuration change.

Next, description is made of the solution of conflict between making the configuration change redundant and the redundancy restoration of the RAID group. FIG. 7 is a flowchart explaining processing operation of the storage controller at the time when a disk failure has occurred during the execution of a configuration change.

Upon occurrence of a disk failure during the execution of the configuration change, the redundancy restoration processor 14 inside the storage controller 10 references the disk management table 12b, and determines whether one or more spare disks usable for the redundancy restoration, that is, one or more spare disks that have been set as spare disks and that are unused for making the storage management device redundant, exist within the storage system (S201). If one or more usable spare disks exist (Yes in S201), the redundancy restoration processor 14 starts redundancy restoration processing using the one or more usable spare disks (S207).

If there exists no usable disk (No in S201), the redundancy restoration processor 14 references the RAID management table 12a, and determines whether a RAID group to which a failed disk belongs is executing a configuration change using one or more spare disks (S202).

If the RAID group to which the failed disk belongs is executing a configuration change using the one or more spare disks (Yes in S202), the redundancy restoration processor 14 checks the priority of configuration change in the RAID management table 12a, and determines whether the group can release the one or more spare disks (S203). Since, here, the disk failure has occurred in the RAID group during the configuration change, the one or more spare disks become releasable if the priority of configuration change is the own group disk failure addressing priority or the disk failure addressing priority.

If the one or more spare disks are releasable in the same group (Yes in S203), the RAID configuration change processor 16 determines whether the old configuration before the configuration change is the RAID 1 (S204).

If the old configuration is the RAID 1 (Yes in S204), because the number of spare disks secured by the spare disk securing unit 16a is one, the spare disk securing unit 16a releases the secured spare disk, and the change processing redundancy implementing unit 16b continues the processing as a configuration change based on the spare non-usage (S208).

On the other hand, if the old configuration is not RAID 1 (No in S204), the change processing redundancy implementing unit 16b stores data within an in-process expansion range, that is, data existing in the buffer upon being read out from the old configuration, into one of the spare disks in use (S105). Thereafter, the spare disk securing unit 16a releases one or more spare disks other than the spare disk storing buffer data, and the change processing redundancy implementing unit 16b continues the processing as a configuration change based on the salvage guarantee (S206). Also, the redundancy restoration processor 14 starts redundancy restoration processing using the spare disk released by the spare disk securing unit 16a (S207).

If the RAID group to which the failed disk belongs is not executing a configuration change using one or more spare disk (No in S202), when the no spare disk is releasable because of the priority of configuration change of the RAID group to which the failed disk belongs (No in S203), the redundancy restoration processor 14 references the RAID management table 12a, and determines whether any of the RAID group executing a configuration change using one or more spare disks exists in the storage system (S209).

If there exists any RAID group executing a configuration change using one or more spare disks, other than the RAID group to which the failed disk belongs (Yes in S209), the redundancy restoration processor 14 checks the priority of configuration change in the RAID management table 12a, and determines whether the RAID group executing a configuration change using one or more spare disks can release one or more spare disks for another group (S210). Since this case corresponds to the case where the disk failure has occurred outside the RAID group executing the configuration change, the one or more spare disks becomes releasable when the priority of configuration change is the disk failure addressing priority.

If there are one or more spare disks releasable to another RAID group (Yes in S210), the RAID configuration change processor 16 determines whether, among RAID groups capable of releasing one or more spare disks, there exists a RAID group of which the old configuration is other than RAID 1 (S211).

If one or more spare disks are releasable from a configuration other than the RAID 1 (Yes in S211), the change processing redundancy implementing unit 16b stores data within an in-process expansion range, that is, data existing in the buffer upon being read out from the old configuration, into one of the spare disks in use (S205). Thereafter, the spare disk securing unit 16a releases one or more spare disks other than the spare disk storing buffer data, and the change processing redundancy implementing unit 16b continues the processing as a configuration change based on the salvage guarantee (S206). Then, the redundancy restoration processor 14 starts redundancy restoration processing using the one or more spare disks released by the spare disk securing unit 16a (S207).

On the other hand, if the old configuration of the RAID group capable of releasing a spare disk is the RAID 1 (No in S211), since the number of secured spare disks is one, the spare disk securing unit 16a releases the secured spare disk, and the change processing redundancy implementing unit 16b continues the processing as a configuration change based on the spare non-usage (S208). Also, the redundancy restoration processor 14 starts redundancy restoration processing using the spare disk released by the spare disk securing unit 16a (S207).

Next, a specific example of configuration change by the storage controller 10 will be described. Here, shown is an example in which a configuration change is performed from RAID 5(3+1) to RAID 5(4+1), on the basis of salvage guarantee. The RAID 5(4+1) of the old configuration comprises disks D11, 21, 31, and 41. By newly adding a disk Dx to this configuration, RAID 5(4+1) is created. Here, a buffer Bf is used for the temporary holding of data concerning a configuration change. Furthermore, the RAID configuration change processor 16 secures disks Ds as spare disks at the start time of configuration change.

Figure 8:
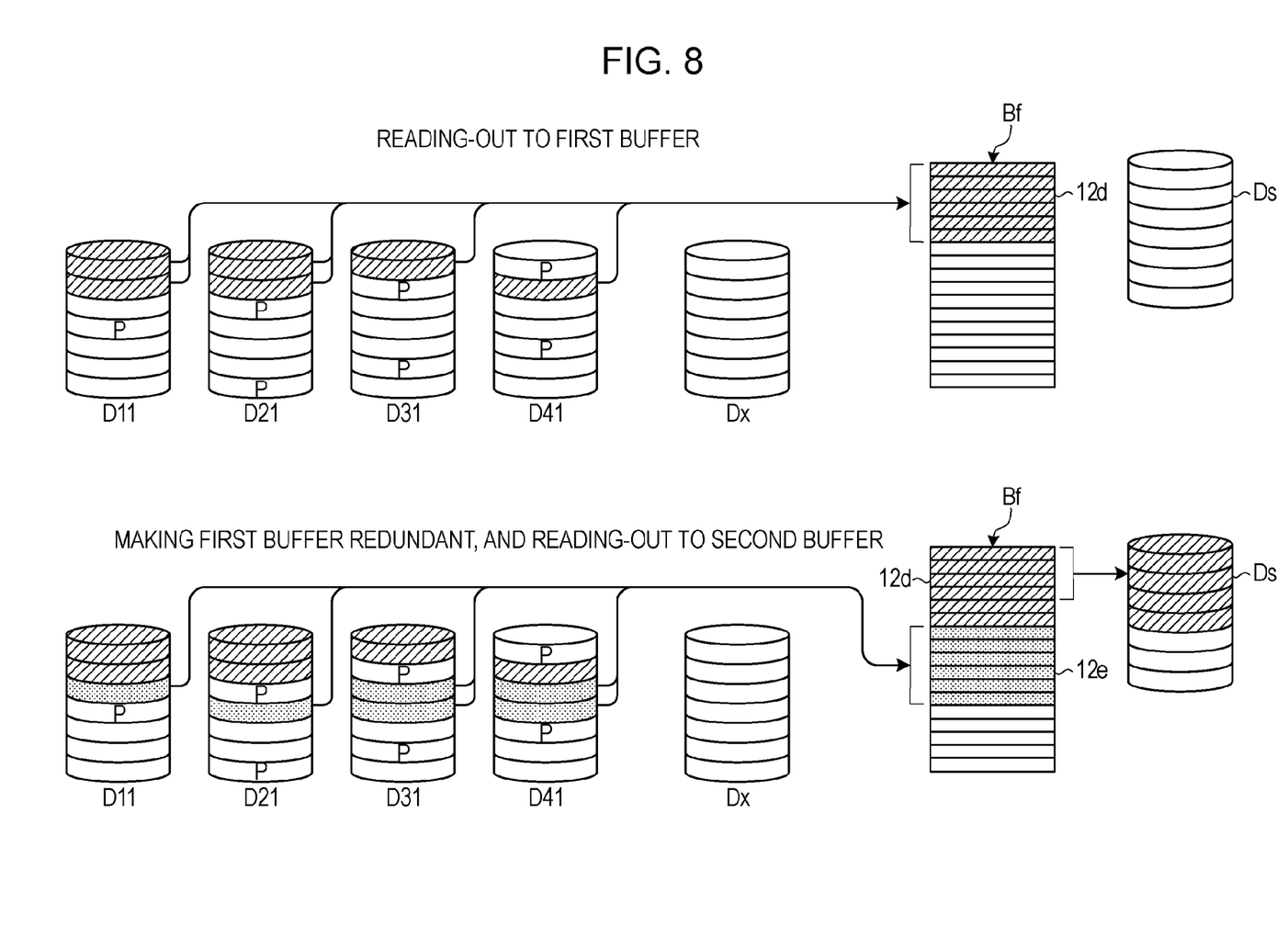
FIG. 8 is a diagram illustrating a first specific example of configuration change.

Firstly, as illustrated in FIG. 8, the RAID configuration change processor 16 reads out 2 stripes of data form the old configuration and stores it into the buffer Bf. Here, because a first data in the disk D41 and a second data in the disk D31 are each parity P, they are not read out, so that the number of pieces of data read-out from the old configuration is 6. The RAID configuration change processor 16 stores the read-out data into the buffer Bf. Here, the region in which the read-out data is stored is referred to as a first buffer region 12d.

More specifically, the storage into the buffer Bf is performed by adding in-use final addresses of the buffer management table 12c as much the number of buffers as needed. In this addition, when the final address is reached, the rest is counted from the buffer address "0". If the in-use final address does not overtake the in-use head address in this addition, the acquisition of buffers achieves success. Upon taking the value of buffer group of the acquired buffers as the first buffer, the RAID configuration change processor 16 stores the data read-out from the old configuration into the acquired first buffer.

Next, the change processing redundancy implementing unit 16b reads out four pieces of data from the first buffer 12d and writes it into the disk Ds, to thereby make data in the first buffer 12d redundant. The RAID configuration change processor 16 reads out 2 stripes of data from the old configuration and stores it into the buffer Bf, as the second buffer 12e.

In this manner, by concurrently performing the writing-in from the first buffer to the spare disk and the reading-out from the old configuration to the second buffer, it is possible to prevent configuration change processing without implementing redundancy from the buffer to the spare disk, from the occurrence of processing delay.

The reason why the number of pieces of data to be written from the buffer into the disk Ds was taken as 4 is because the writing-back to the new configuration is performed with respect to 1 stripe of data, that is, the number of pieces of data is 4.

Figure 9:
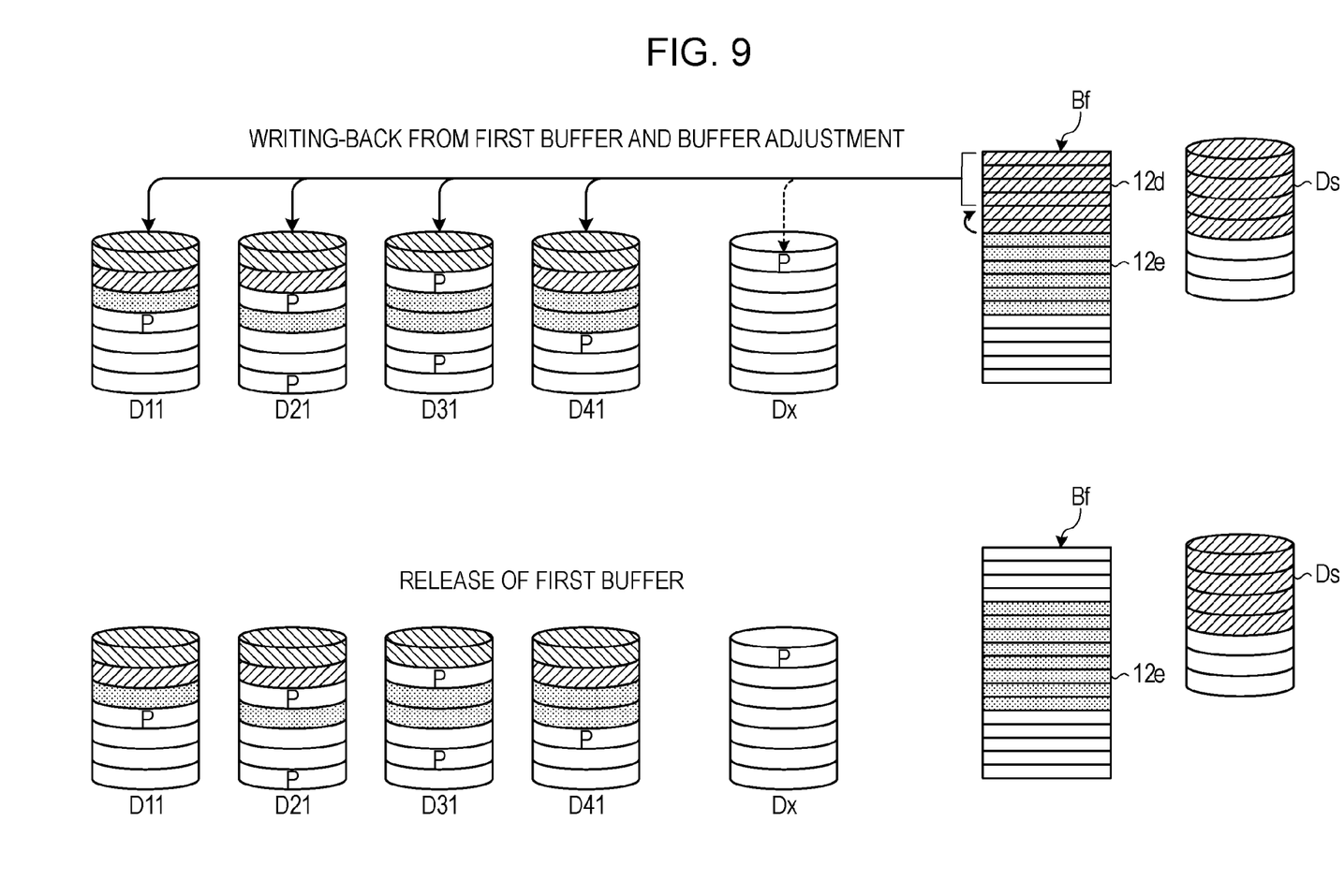
FIG. 9 is a diagram illustrating a second specific example of configuration change.

Then, as illustrated in FIG. 9, the RAID configuration change processor 16 reads out 4 pieces of data corresponding to 1 stripe of the new configuration, from the first buffer 12d of the buffer Bf, and writes back it to the disks D11, 21, 31, and 41, as well as writes parity P into the disk Dx upon calculation of it.

If the number of pieces of data read-out from the old configuration and the number of pieces of data written-back to the new configuration can be matched with each other, i.e., if, among common multiples between the number of pieces of data per stripe of the old configuration and the number of pieces of data per stripe of the new configuration, there exists a value lower than the upper limit of the RAID group access, all of the first buffers can be written back at one time.

However, in the example illustrated in FIG. 9, the number of pieces of data read-out from the old configuration is 6, and the number of pieces of data written into the new configuration is 4, that is, there is a mismatch between them. As a result, after the writing-back to the new configuration has been performed, 2 pieces of data remains in the first buffer 12d. The change processing redundancy implementing unit 16b performs a buffer adjustment for making the data left after the writing-back from the first buffer 12d the head part of the second buffer 12e, and thereupon, releases the first buffer 12d. The release of the buffer is implemented by adding in-use head addresses, in the buffer management table 12c. In this addition, when the final address is reached, the rest is counted from the buffer address "0". The in-use head address may coincide with an in-use start address, but there is no possibility of overtaking the in-use start address.

Figure 10:
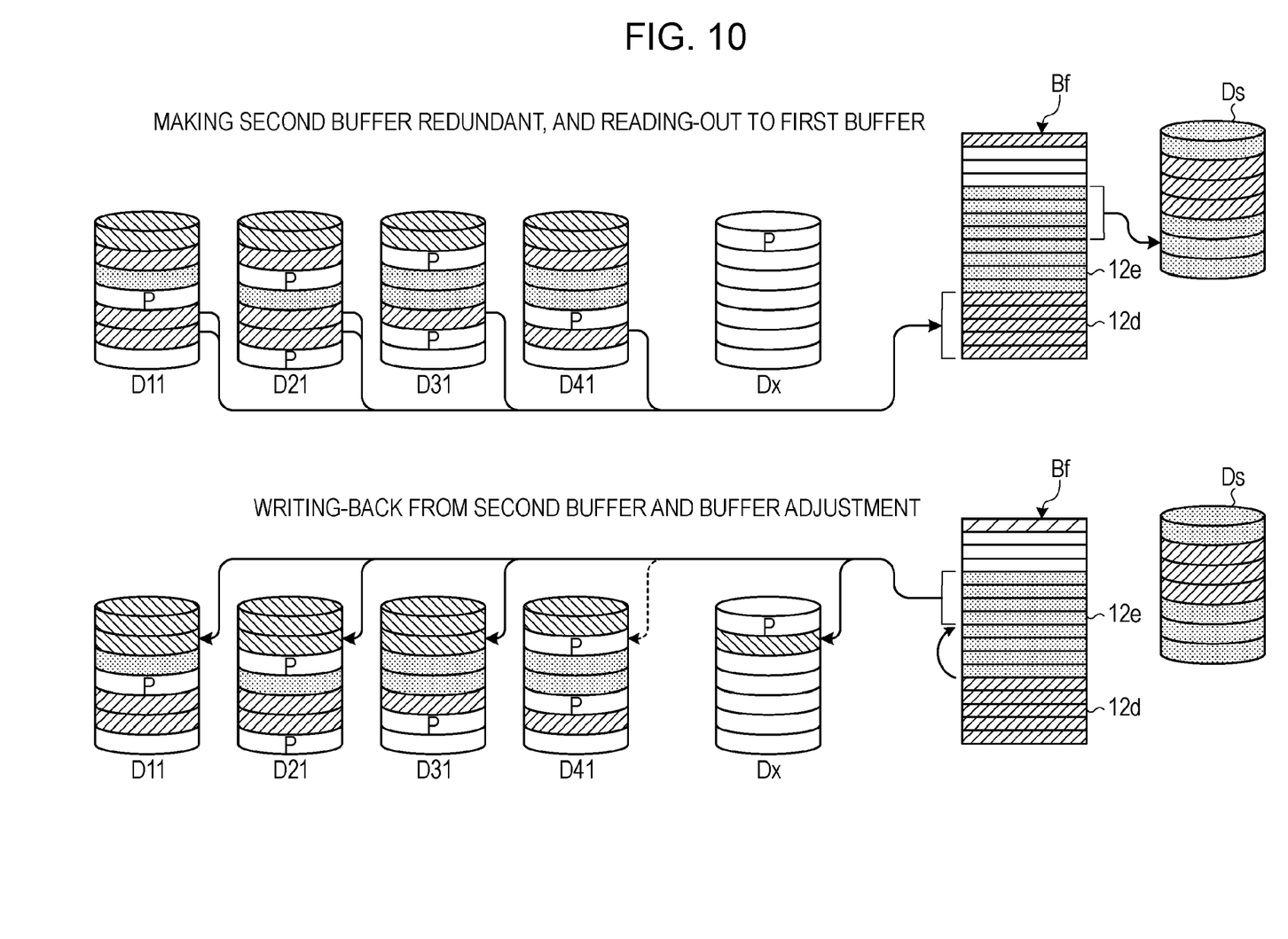
FIG. 10 is a diagram illustrating a third specific example of configuration change.

Then, as illustrated in FIG. 10, the change processing redundancy implementing unit 16b reads out 4 pieces of data from the second buffer 12e and writes it into the disk Ds, to thereby make data in the second buffer 12e redundant. The RAID configuration change processor 16 reads out 2 stripes of data from the old configuration and stores it into the buffer Bf, as the first buffer 12d. Here, the buffer Bf and the spare disk Ds are used in a ring-shaped manner, and after data has been written up to the terminal of a storage region, next data is written-in from the head.

Thereafter, the RAID configuration change processor 16 reads out 4 pieces of data corresponding to 1 stripe of data in the new configuration, from the second buffer 12e of the buffer Bf, and writes back it to the disks D11, 21, 31, 41, and Dx, as well as writes parity P into the disk D41 upon calculation of it. The change processing redundancy implementing unit 16b performs a buffer adjustment for making data left after the writing-back from the second buffer 12e the head part of the first buffer 12d, and thereupon, releases the second buffer 12e.

Hereinafter, the RAID configuration change processor 16 proceeds the configuration change by repeating the reading-out to the second buffer and making the first buffer redundant, the rewriting-back of the first buffer and a buffer adjustment, the reading-out to the first buffer and making the second buffer redundant, and the rewriting-back of the second buffer and a buffer adjustment.

As described above, in this embodiment, when performing a configuration change of the RAID group, upon placing data read-out from the old configuration into the buffer, the data is written into one or more spare disks to make the data redundant. At this time, data being subjected to the execution of configuration change exists in the disks, the one or more spare disks, and the buffers that constitute the RAID group. Thereafter, the data is written back to disks constituting the RAID group, as a new configuration, and therefore, even if an abnormality occurs in the data in the buffer during the writing into the new configuration, the change processing/restoration processor 16c reads out data from the spare disk to allow continuation of the change processing. Moreover, in the reversible conversion guarantee, which secures a sufficient number of spare disks to hold all data concerning the configuration change, the change processing/restoration processor 16c reads out the data from the spare disks and writes back, as the old configuration, thereby making it possible to interrupt the configuration change at an optional timing and restore the old configuration.

A buffer to be used for a configuration change processing into two groups, and while writing data read-out from the old configuration into one of the buffers, the writing-in from the other buffer to spare disks is performed, whereby effects of processing delay due to addition of writing-in processing with respect to spare disks are suppressed.

Furthermore, by using spare disks prepared for redundancy securing in the RAID group for making the configuration change redundant, and by defining the priority relationship between the redundancy securing in the RAID group and making the configuration change processing redundant, it is possible to prevent data disappearance during configuration change without increasing the cost for system building, and to interrupt the configuration change to restore the original configuration.

While, in this embodiment, description has been made by taking as an example a RAID system in which hard disks are used as storage devices, the techniques disclosed herein are not limited to this embodiment, but can be implemented using optional recording media.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

Therefore, according to an aspect of the embodiments of the invention, any combinations of one or more of the described features, functions, operations, and/or benefits can be provided. A combination can be one or a plurality. The embodiments can be implemented as an apparatus (a machine) that includes computing hardware (i.e., a computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The storage management device may include a controller (CPU) (e.g., a hardware logic circuitry based computer processor that processes or executes instructions, namely software/program), computer readable recording media, transmission communication media interface (network interface), and/or a display device, all in communication through a data communication bus. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be displayed on the display.

Program(s)/software implementing the embodiments may be recorded on non-transitory tangible computer-readable recording media. Examples of the computer-readable recording media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), a CD-R (Recordable) and a CD-RW.

Although a few preferred embodiments of the present invention have been shown and described, it would be appreciated by those skilled in the art that changes may be made in these embodiments without departing from the principles and spirit of the invention, the scope of which is defined in the claims and their equivalents.

The many features and advantages of the embodiments are apparent from the detailed specification and, thus, it is intended by the appended claims to cover all such features and advantages of the embodiments that fall within the true spirit and scope thereof. The claims may include the phrase "at least one of A, B and C" as an alternative expression that means one or more of A, B and C may be used, contrary to the holding in Superguide v. DIRECTV, 358 F3d 870, 69 USPQ2d 1865. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A storage management device that manages data storage devices storing user data, and one or more spare storage devices used when a failure occurs in any of the data storage devices, the storage management device comprising:
a group management unit that divides the data storage devices into groups and that implements at least one of the distribution and the redundancy of the user data between the data storage devices belonging to the same group;
a data storage device restoration processor that, on the occurrence of a failure in any of the data storage devices, assigns the one or more spare storage devices as a replacement for the failed data storage device; and
a configuration change processor that performs configuration change processing of the group to which the data storage devices belong,
wherein the configuration change processor comprises:
a spare storage device securing unit that secures the one or more spare storage devices;
a change processing redundancy implementing unit that writes data concerning the configuration change processing of the group into the one or more spare storage devices secured by the spare storage device securing unit; and
a change processing/restoration processor that, if the configuration change of the group is interrupted, performs continuation of the configuration change of the group, or restoration of the group to its state before the start of the change, using the data written into the one or more spare storage devices.

2. The storage management device according to claim 1, wherein, when performing the configuration change of the group, the configuration change unit writes the user data read-out from the data storage device before the configuration change, into a first buffer and a second buffer in an alternate manner; and
wherein the change processing redundancy implementing unit, upon reading out the user data written into the first buffer during the writing-in processing with respect to the second buffer, writes the user data into the one or more spare storage devices secured by the spare storage device securing unit, and upon reading out the user data written into the second buffer during the writing-in processing with respect to the first buffer, writes the user data into the one or more spare storage devices secured by the spare storage device securing unit.

3. The storage management device according to claim 1, wherein, in the configuration change of the group, the spare disk securing unit secures one or more spare storage devices that can store all user data read-out from the data storage devices belonging to the group.

4. The storage management device according to claim 1, wherein, in the configuration change of the group, the spare disk securing unit secures one or more spare storage devices that can store data read-out from the data storage devices belonging to the group until the data is written back to the data storage device after the configuration change.

5. The storage management device according to claim 1, wherein, when a failure occurs in any of the data storage devices during the securing of the one or more spare storage devices by the spare storage device securing unit, the spare storage device securing unit releases one or more spare storage devices, and the change processing redundancy implementing unit continues the redundancy implementing processing upon changing the redundancy implementing processing operation into one in which the number of used spare storage devices is small.

6. The storage management device according to claim 5, wherein, for each of the groups, the group management unit sets a priority relationship between the configuration change of the group by the configuration change processor and the assignment processing of the one or more spare storage devices by the storage device restoration processor; and wherein, when a failure occurs in the data storage device belonging to one of the groups, the group management unit determines from which group the one or more spare storage devices is to be released, on the basis of the priority relationships of the respective groups.

7. The storage management device according to claim 6, wherein, after having reduced the number of spare storage devices used by the change processing redundancy implementing unit, the configuration change processor releases the one or more spare storage devices.

8. A storage management method for managing data storage devices storing user data, and one or more spare storage devices used when a failure occurs in any of the data storage devices, the storage management method comprising:

dividing the data storage devices into groups and implementing at least one of the distribution and the redundancy of the user data between the data storage devices belonging to the same group;

assigning the one or more spare storage devices as a replacement for the failed data storage device on the occurrence of a failure in any of the data storage devices; and performing configuration change processing of the group to which the data storage devices belong, wherein the configuration change processing comprises:
securing the one or more spare storage devices;
writing data concerning the configuration change processing of the group into the one or more spare storage devices; and
performing continuation of the configuration change of the group, or restoration of the group to its state before the start of the change, using the data written into the one or more spare storage devices if the configuration change of the group is interrupted.

9. A storage system comprising:
data storage devices storing user data;
one or more spare storage devices used when a failure occurs in any of the data storage devices;
a group management unit that divides the data storage devices into groups and that implements at least one of the distribution and the redundancy of the user data between the data storage devices belonging to the same group;
a data storage device restoration processor that, on the occurrence of a failure in any of the data storage devices, assigns the one or more spare storage devices as a replacement for the failed data storage device; and
a configuration change processor that performs configuration change processing of the group to which the data storage devices belong,
wherein the configuration change processor comprises:
a spare storage device securing unit that secures the one or more spare storage devices;
a change processing redundancy implementing unit that writes data concerning the configuration change processing of the group into the one or more spare storage devices secured by the spare storage device securing unit; and
a change processing/restoration processor that, if the configuration change of the group is interrupted, performs continuation of the configuration change of the group, or restoration of the group to its state before the start of the change, using the data written into the one or more spare storage devices.

10. A storage management device, comprising:
a first configuration in which a plurality of storage devices are grouped together to form a first single logical storage device;
a spare storage device storing the first configuration, and instructions to restore the first configuration;
a second configuration in which the plurality of storage devices are grouped together to form a second single logical storage device; and
a configuration changer that changes from the first configuration to the second configuration, the configuration changer retrieving the first configuration and executing the instructions to restore the first configuration if a change from the first configuration to the second configuration is interrupted before completion.

11. The storage management device of claim 10, wherein the first configuration and the second configuration are selected from the group consisting of:
RAID 1,
RAID 2,
RAID 3,
RAID 4,
RAID 5, and
RAID 6.

* * * * *